(12) United States Patent
Suzuki et al.

(10) Patent No.: US 9,486,699 B2
(45) Date of Patent: Nov. 8, 2016

(54) INFORMATION PROCESSING SYSTEM, NON-TRANSITORY COMPUTER-READABLE STORAGE MEDIUM HAVING STORED THEREIN INFORMATION PROCESSING PROGRAM, INFORMATION PROCESSING APPARATUS, AND INFORMATION PROCESSING METHOD

(71) Applicant: NINTENDO CO., LTD., Kyoto (JP)

(72) Inventors: Ichiro Suzuki, Kyoto (JP); Tsubasa Sakaguchi, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 14/475,893

(22) Filed: Sep. 3, 2014

(65) Prior Publication Data

US 2015/0352438 A1 Dec. 10, 2015

(30) Foreign Application Priority Data

Jun. 6, 2014 (JP) .................................. 2014-117951

(51) Int. Cl.
*A63F 13/213* (2014.01)
*A63F 13/211* (2014.01)
(Continued)

(52) U.S. Cl.
CPC ............ *A63F 13/211* (2014.09); *A63F 13/213* (2014.09); *A63F 13/26* (2014.09); *A63F 13/525* (2014.09); *A63F 13/5255* (2014.09); *A63F 2300/105* (2013.01); *A63F 2300/6661* (2013.01); *A63F 2300/6676* (2013.01)

(58) Field of Classification Search
CPC .. A63F 13/211; A63F 13/213; A63F 13/525; A63F 13/5255; A63F 2300/105; A63F 2300/6661; A63F 2300/6676

USPC .......................... 345/419, 473, 647, 660, 156
See application file for complete search history.

(56) References Cited

U.S. PATENT DOCUMENTS

| | | | | |
|---|---|---|---|---|
| 6,323,895 B1 * | 11/2001 | Sata | ......................... | A63F 13/10 348/39 |
| 7,259,764 B2 * | 8/2007 | Anderson | ............... | G06T 13/40 345/473 |

(Continued)

FOREIGN PATENT DOCUMENTS

| | | |
|---|---|---|
| EP | 2030661 A2 | 3/2009 |
| EP | 2475178 A2 | 7/2012 |

(Continued)

OTHER PUBLICATIONS

U.S. Appl. No. 13/271,510, filed Oct. 12 2011, Hiroshi Matsunaga.

(Continued)

*Primary Examiner* — Quan-Zhen Wang
*Assistant Examiner* — Tony Davis
(74) *Attorney, Agent, or Firm* — Nixon & Vanderhye, P.C.

(57) ABSTRACT

An information processing system includes an information processing unit configured to move a virtual camera in a virtual space within a predetermined movable range in response to a movement and/or a posture of a controller. The information processing unit changes a correspondence relation between the movement and/or the posture of the controller and a capturing direction and/or a viewing point position of the virtual camera after the movement of the virtual camera reaches a limit of the movable range due to the movement of the controller in a predetermined direction.

32 Claims, 11 Drawing Sheets

(51) Int. Cl.
*A63F 13/5255* (2014.01)
*A63F 13/525* (2014.01)
*A63F 13/26* (2014.01)

(56) References Cited

U.S. PATENT DOCUMENTS

| | | | | |
|---|---|---|---|---|
| 8,081,822 | B1* | 12/2011 | Bell | G06F 3/017 345/157 |
| 8,267,782 | B2* | 9/2012 | Suzuki | G06T 15/20 463/32 |
| 8,836,693 | B2* | 9/2014 | Katano | A63F 13/10 345/419 |
| 2004/0224761 | A1* | 11/2004 | Nishimura | A63F 13/10 463/33 |
| 2005/0010876 | A1* | 1/2005 | Robertson | G06F 3/0481 715/782 |
| 2006/0106494 | A1* | 5/2006 | Alvarez | G05B 19/409 700/251 |
| 2007/0265088 | A1* | 11/2007 | Nakada | A63F 13/04 463/37 |
| 2008/0024615 | A1* | 1/2008 | Alvarez | H04N 5/232 348/211.7 |
| 2009/0070093 | A1* | 3/2009 | Nakanishi | A63F 13/00 703/22 |
| 2010/0279770 | A1* | 11/2010 | Ikeda | A63F 13/10 463/32 |
| 2011/0025598 | A1* | 2/2011 | Underkoffler | G06F 3/017 345/156 |
| 2011/0249152 | A1* | 10/2011 | Lindsay | G06T 7/004 348/241 |
| 2012/0007882 | A1 | 1/2012 | Sakurai et al. | |
| 2012/0314899 | A1* | 12/2012 | Cohen | G06F 3/04815 382/103 |
| 2013/0271510 | A1 | 10/2013 | Matsumoto | |

FOREIGN PATENT DOCUMENTS

| | | |
|---|---|---|
| EP | 2497545 A2 | 9/2012 |
| JP | 2012-252468 | 12/2012 |
| JP | 2013069301 A | 4/2013 |

OTHER PUBLICATIONS

European Patent Office, "Communication with Extended European Search Report," issued in connection with European Patent Application No. 14184371.4, dated Nov. 2, 2015 (8 pages).

English-language Abstract and machine translation of JP 2013-069301 A.

* cited by examiner

INFORMATION PROCESSING SYSTEM, NON-TRANSITORY COMPUTER-READABLE STORAGE MEDIUM HAVING STORED THEREIN INFORMATION PROCESSING PROGRAM, INFORMATION PROCESSING APPARATUS, AND INFORMATION PROCESSING METHOD

CROSS REFERENCE TO RELATED APPLICATION

This application claims the benefit of Japanese Priority Patent Application JP 2014-117951 filed on Jun. 6, 2014, the entire contents of which are incorporated herein by reference. The entire content of U.S. patent application Ser. No. 13/271,510 is also incorporated herein by reference.

FIELD

The technology herein relates to an information processing system, a non-transitory computer-readable storage medium having stored therein an information processing program, an information processing apparatus, and an information processing method of operating a virtual camera in a virtual space in response to the movement of a controller.

BACKGROUND AND SUMMARY

Hitherto, there has been known an information processing system that detects a movement or a posture of a controller in a real space as inputs to the controller for changing a capturing direction or a viewing point position of a virtual camera. In such an information processing system, an operation in which a user moves the controller in the real space so as to change a posture or a position thereof corresponds to an operation in which the capturing direction or the viewing point position of the virtual camera is changed in a virtual space, and hence the user may obtain a realistic sensation in which the virtual camera is directly operated (for example, see JP 2012-252468 A).

SUMMARY

The present disclosure provides an information processing system that moves a virtual camera in a virtual space within a predetermined movable range in response to a movement of a controller to improve the operability of a virtual camera.

There is provided an information processing system of an example embodiment that includes: a sensor configured to detect a movement and/or a posture and/or orientation or direction or the like) of a controller; and an information processing unit configured to move a virtual camera in a virtual space within a predetermined movable range in response to a movement and/or a posture of a controller, wherein the information processing unit changes correspondence relation between the movement and/or the posture of the controller and a capturing direction and/or a viewing point position of the virtual camera after the capturing direction and/or the viewing point position of the virtual camera reaches a limit of the movable range in response to the movement and/or the posture of the controller in a predetermined direction. With this configuration, since the correspondence relation between the movement and/or the posture of the controller and the capturing direction and/or the viewing point position of the virtual camera is not fixed, it is possible to improve the operability of the virtual camera even when the controller is further operated after the capturing direction and/or the viewing point position of the virtual camera reaches the limit of the movable range. Here, the movement of the controller includes a change in position and a change in posture of the controller, and this movement may be detected by, for example, an acceleration sensor.

The information processing unit may generate a captured image of the virtual camera and output the captured image to a display. With this configuration, the user may see the captured image of the virtual camera operated by the movement of the controller.

The information processing system may further include the display. With this configuration, the user may see the captured image of the virtual camera operated by the movement of the controller.

The information processing unit may operate the virtual camera in response to the rotation of the controller about a predetermined controller axis. With this configuration, the user may operate the virtual camera by changing the posture of the controller in the real space.

The rotation of the controller may be a rotation in the pitch direction. With this configuration, the user may operate the virtual camera by changing the posture of the controller in the pitch direction.

The information processing unit may operate the virtual camera in response to a shifting of the controller. With this configuration, the user may operate the virtual camera by shifting the controller in the real space.

The information processing unit may rotate the virtual camera about a predetermined camera axis. With this configuration, the user may change the capturing direction of the virtual camera by moving the controller.

The rotation of the virtual camera may be a rotation in the pitch direction. With this configuration, the user may change the capturing direction of the virtual camera in the pitch direction by moving the controller.

The information processing unit may shift the virtual camera. With this configuration, the user may change the viewing point position of the virtual camera by moving the controller.

The information processing unit may change the correspondence relation when a position and/or a posture of the virtual camera reaches the limit of the movable range and the controller is moved to a position or a posture exceeding a predetermined threshold value or the position and/or the posture of the virtual camera reaches the limit of the movable range and the posture of the controller becomes a posture exceeding a predetermined threshold value. With this configuration, since the movable range is changed after the controller is further operated so that the capturing direction and/or the viewing point position of the virtual camera exceeds the limit of the movable range instead of promptly changing the correspondence relation when the virtual camera may not move, it is possible to prevent the correspondence relation from being changed frequently.

The information processing unit may correlate the position or the posture of the controller operated so as to exceed the threshold value or be a posture exceeding the threshold value to the limit of the movable range. With this configuration, it is possible to promptly operate the virtual camera in the opposite direction when the controller is operated in the opposite direction after the controller is operated so as to exceed the threshold value.

The information processing unit may change the correspondence relation in response to a degree in which the controller is further operated after the virtual camera reaches the limit of the movable range. With this configuration, it is possible to continuously change the correspondence relation between the movement and/or the posture of the controller and the capturing direction and/or the viewing point position of the virtual camera.

The information processing unit may change the correspondence relation in the entire movable range. With this configuration, the correspondence relation is changed in the entire movable range.

The information processing unit may shift the correspondence relation in a direction in which the controller is operated. With this configuration, the correspondence relation is changed while the shape of the correspondence relation is maintained.

The information processing unit may change the correspondence relation other than a predetermined fixed position within the movable range while maintaining the correspondence relation at the fixed position within the movable range. With this configuration, the correspondence relation is changed other than the fixed position while the fixed position is fixed.

The information processing unit may stretch the correspondence relation in a direction in which the controller is operated. With this configuration, the correspondence relation is changed by the deformation.

The fixed position may include a point where the capturing direction of the virtual camera becomes horizontal in the virtual space. With this configuration, the correspondence relation is fixed in the posture or the position of the controller in which the capturing direction of the virtual camera becomes horizontal.

The information processing unit may change the correspondence relation other than a predetermined fixed position within the movable range while maintaining the correspondence relation at the fixed position within the movable range and may change the correspondence relation in the entire movable range when the controller is operated so as to exceed a second threshold value. With this configuration, when the controller is operated so as to exceed the threshold value, the correspondence relation is first stretched. Then, when the controller further exceeds the second threshold value (the stretch limit), the correspondence relation may be shifted therefrom.

The information processing unit may change the correspondence relation in response to a degree in which the controller is operated so as to exceed the limit of the movable range other than the fixed position within the movable range and may change the correspondence relation in response to a degree in which the controller is operated so as to exceed the second threshold value in the entire movable range when the controller is operated so as to exceed the second threshold value. With this configuration, the correspondence relation is changed by the amount corresponding to the movement and/or the posture of the controller.

The information processing unit may change the correspondence relation in the entire movable range and may change the correspondence relation other than a predetermined fixed position within the movable range while maintaining the correspondence relation of the second threshold value in the predetermined fixed position within the movable range when the controller is further operated so as to exceed the second threshold value. With this configuration, when the controller is operated so as to exceed the threshold value, the correspondence relation is first shifted. Then, when the controller further exceeds the second threshold value (the shift limit), the correspondence relation may be stretched therefrom.

The information processing unit may change the correspondence relation in response to a degree in which the controller is operated so as to exceed the limit of the movable range in the entire movable range and may change the correspondence relation in response to a degree in which the controller is operated so as to exceed the second threshold value other than the fixed position within the movable range when the controller is operated so as to exceed the second threshold value. With this configuration, the correspondence relation is changed by the amount corresponding to the movement and/or the posture of the controller.

The information processing unit may operate the virtual camera in response to the movement and/or the posture of the controller in accordance with the changed correspondence relation when the controller is operated in a direction opposite to the predetermined direction after the correspondence relation is changed. With this configuration, when the controller is operated in a direction in which the changed correspondence relation returns to the original correspondence relation after the correspondence relation is changed, the virtual camera may be operated by a new correspondence relation.

The information processing unit may change the correspondence relation so that a difference from the unchanged correspondence relation gradually decreases in response to the movement and/or the posture of the controller in a direction opposite to the predetermined direction when the controller is operated to a predetermined change limit in a direction opposite to the predetermined direction. With this configuration, the correspondence relation may be gradually returned to the original correspondence relation when the controller is operated so as to exceed the change limit.

The controller may return the correspondence relation to the unchanged correspondence relation when the virtual camera is operated to a reference capturing direction and/or a reference viewing point position while exceeding the predetermined change limit in a direction opposite to the predetermined direction. With this configuration, the correspondence relation between the movement and/or the posture of the controller and the movement of the virtual camera may be gradually returned to the unchanged correspondence relation when the controller is operated so as to exceed the change limit.

A predetermined capturing direction and/or a predetermined viewing point position of the virtual camera may be correlated to the controller in response to a predetermined operation performed on the controller. With this configuration, since the predetermined capturing direction and/or the predetermined viewing point position of the virtual camera may be correlated to the arbitrary posture or the arbitrary position of the controller, the reference posture or the reference position of the controller with respect to the user may be set when the virtual camera is operated with the movement of the controller.

The information processing system may be provided in the controller. With this configuration, a process of changing the correspondence relation with respect to the movement of the virtual camera in the controller may be performed.

There is provided a non-transitory computer-readable storage medium having stored therein an information processing program of an example embodiment for moving a virtual camera in a virtual space within a predetermined movable range in response to a movement and/or a posture of a controller, the information processing program causing a computer to function as a processor configured to obtain a detection value of the movement and/or the posture of the controller, and change a correspondence relation between the movement and/or the posture of the controller and a capturing direction and/or a viewing point position of the virtual camera after the capturing direction and/or the viewing point position of the virtual camera reaches a limit of the movable range in response to the movement or the posture of the controller in a predetermined direction. Even with this configuration, since the correspondence relation between the movement and/or the posture of the controller and the capturing direction and/or the viewing point position of the virtual camera is not fixed, it is possible to improve the operability of the virtual camera even when the controller is further operated after the capturing direction and/or the viewing point position of the virtual camera reaches the limit of the movable range.

There is provided an information processing apparatus of an example embodiment that moves a virtual camera in a virtual space within a predetermined movable range in response to a movement and/or a posture of a controller, wherein the information processing apparatus is configured to: obtain a detection value of the movement and/or the posture of the controller; and change a correspondence relation between the movement and/or the posture of the controller and a capturing direction and/or a viewing point position of the virtual camera after the capturing direction and/or the viewing point position of the virtual camera reaches a limit of the movable range in response to the movement and/or the posture of the controller in a predetermined direction. Even with this configuration, since the correspondence relation between the movement and/or the posture of the controller and the capturing direction and/or the viewing point position of the virtual camera is not fixed, it is possible to improve the operability of the virtual camera even when the controller is further operated after the capturing direction and/or the viewing point position of the virtual camera reaches the limit of the movable range.

There is provided an information processing method of an example embodiment of moving a virtual camera in a virtual space within a predetermined movable range in response to a movement and/or a posture of a controller, the method including: detecting the movement and/or the posture of the controller; and changing a correspondence relation between the movement and/or the posture of the controller and a capturing direction and/or a viewing point position of the virtual camera after the capturing direction and/or the viewing point position of the virtual camera reaches a limit of the movable range in response to the detected movement and/or the posture of the controller in a predetermined direction. Even with this configuration, since the correspondence relation between the movement and/or the posture of the controller and the capturing direction and/or the viewing point position of the virtual camera is not fixed, it is possible to improve the operability of the virtual camera even when the controller is further operated after the capturing direction and/or the viewing point position of the virtual camera reaches the limit of the movable range.

DETAILED DESCRIPTION OF NON-LIMITING EXAMPLE EMBODIMENTS

Hereinafter, an embodiment of the present technology will be described with reference to the drawings. Furthermore, the embodiment described below illustrates an example of the case where the present technology is implemented, and the present technology is not limited by the specific configuration described below. A specific configuration may be appropriately employed in response to the embodiment of the present technology.

Figure 1:
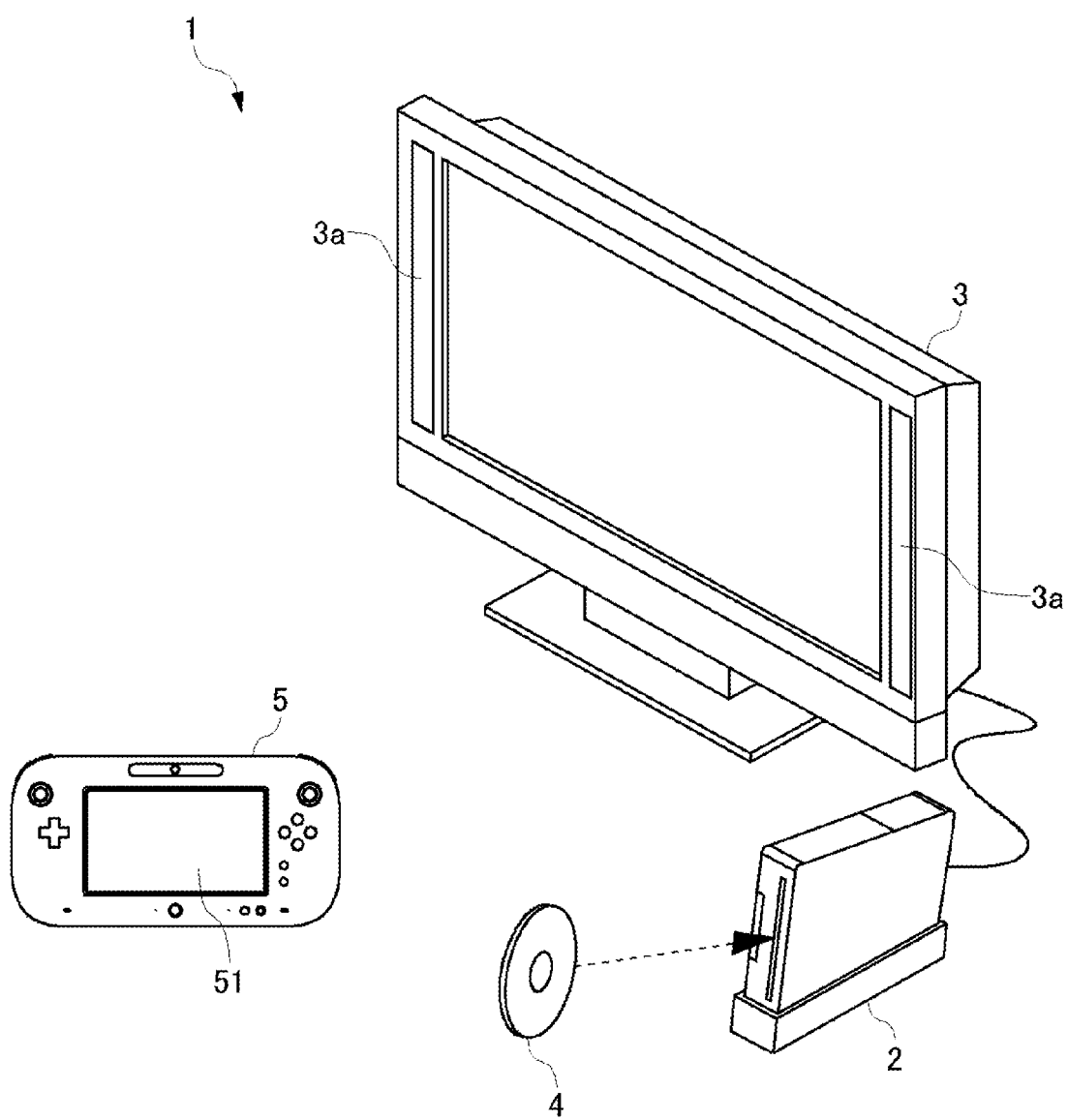
FIG. 1 shows a non-limiting example of a game system including a stationary game apparatus.

Hereinafter, a case will be described in which an information processing system 10 as an embodiment of the present technology is applied to a game system 1 including a stationary game apparatus 2. FIG. 1 shows a non-limiting example of the game system 1 including the stationary game apparatus.

In FIG. 1, the game system 1 includes a home television receiver (hereinafter, referred to as a monitor) 3 which is an example of a display unit and the stationary game apparatus 2 which is connected to the monitor 3 via a connecting cord. The monitor 3 includes a speaker 3*a* which outputs a sound signal output from the game apparatus 2 as a sound. Further, the game apparatus 2 includes an optical disk 4 which stores an information processing program (which is typically called a game program), the game apparatus 2 which is equipped with a computer executing the program of the optical disk 4 and displaying and outputting a game screen on the monitor 3 and/or a controller 5, and the controller 5 which gives operation information necessary for operating an object or the like displayed on the display screen to the game apparatus 2.

The game system 1 executes a game process in the game apparatus 2 based on the game operation using the controller 5, and displays a captured image (a game image) obtained by the game process on the monitor 3 and/or the controller 5. Furthermore, the game apparatus 2 and the controller 5 are wirelessly connected to each other so that a wireless communication may be performed therebetween. For example, the wireless communication is performed according to the standard of Bluetooth (trademark) or IEEE802.11n, but may be performed according to the other standards using an infrared ray and the like.

The optical disk 4 as an example of an information storage medium used in the game apparatus 2 in a replaceable manner is inserted into the game apparatus 2 in a removable manner. The optical disk 4 stores an information processing program to be executed in the game apparatus 2. The front surface of the game apparatus 2 is provided with an insertion slot of the optical disk 4. The game apparatus 2 executes the game process by reading and executing the information processing program stored in the optical disk 4 inserted into the insertion slot. The game apparatus 2 may store in advance the information processing program in a flash memory embedded in the game apparatus 2 and execute the information processing program.

The monitor 3 is connected to the game apparatus 2 via the connecting cord. The monitor 3 displays the game image obtained by the game process executed in the game apparatus 2. The monitor 3 includes the speaker 3a, and the speaker 3a outputs a game sound obtained by the result of the game process. Furthermore, in other embodiments, the game apparatus 2 and the stationary display may be integrated with each other. Further, the communication between the game apparatus 2 and the monitor 3 may be a wireless communication.

Figure 2:
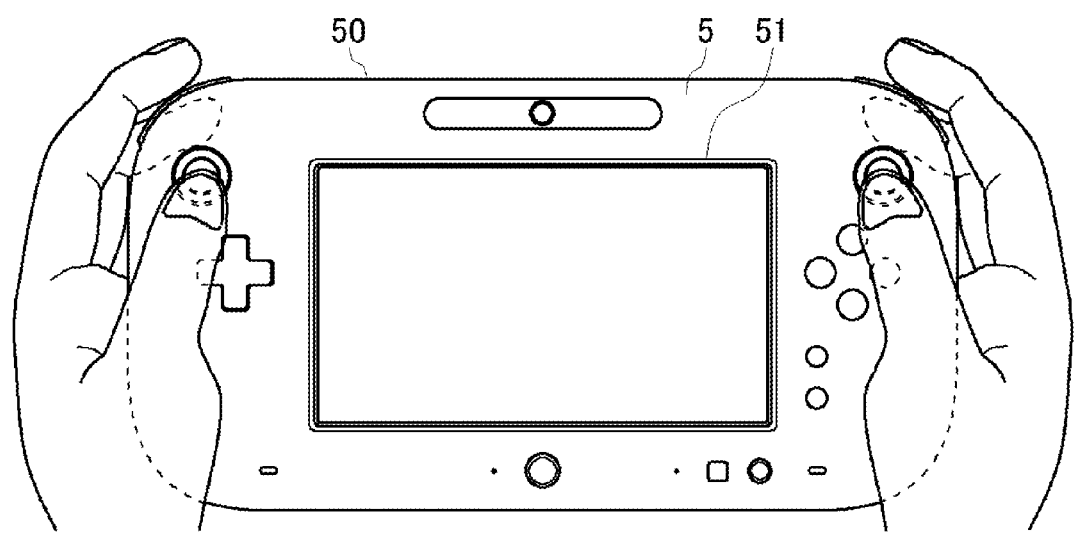
FIG. 2 shows a non-limiting example of a state where a user grips a controller.

FIG. 2 shows a non-limiting example of a state where a user grips the controller 5. The controller 5 includes a housing 50 which is substantially formed in a rectangular shape in the horizontal direction. The housing 50 is formed in a size in which the housing may be gripped by the user. Accordingly, the user may freely grip and move the controller 5 so that the posture or the position is changed (six degrees of freedom in total obtained from three degrees of freedom in rotation and three degrees of freedom in movement (shifting)).

The controller 5 includes a touch panel 51 as an example of a display on the surface of the housing 50. The touch panel 51 includes an LCD (Liquid Crystal Display) panel and a resistive touch sensor. The touch panel 51 is provided in the vicinity of the center of the surface of the housing 50. Accordingly, the user may hold and move the controller 5 while seeing the screen of the touch panel 51 by holding the housing 50 provided in both side portions of the touch panel 51 as illustrated in FIG. 2. The controller 5 is provided with a plurality of operation buttons (including a cross key and the like) provided on the surface of the housing 50 so as to be exposed therefrom.

The controller 5 wirelessly transmits operation information to the game apparatus 2 equipped with a controller communication module. Further, the controller 5 receives a data of an image (for example, a game image) generated by the game apparatus 2 from the game apparatus 2 and displays the image indicated by the data on the touch panel 51. Furthermore, in the embodiment, the LCD is used as the touch panel 51, but the touch panel 51 may include other arbitrary displays, for example, a display using an EL (Electro Luminescence). Further, the touch sensor may be of the other types including an electrostatic capacitive type.

In the embodiment, a game is developed within a three-dimensional virtual space provided by the execution of the game process in the game apparatus 2. When the user moves the controller 5 so as to change the position or the posture thereof, the capturing direction of the virtual camera (the posture of the virtual camera) and the viewing point position (the position of the virtual camera in the virtual space) in the virtual space are changed. Here, the virtual camera indicates a camera which is virtually set in the virtual space, and an image obtained by capturing the virtual space using the virtual camera is displayed on the monitor 3 or the touch panel 51.

Figure 3:
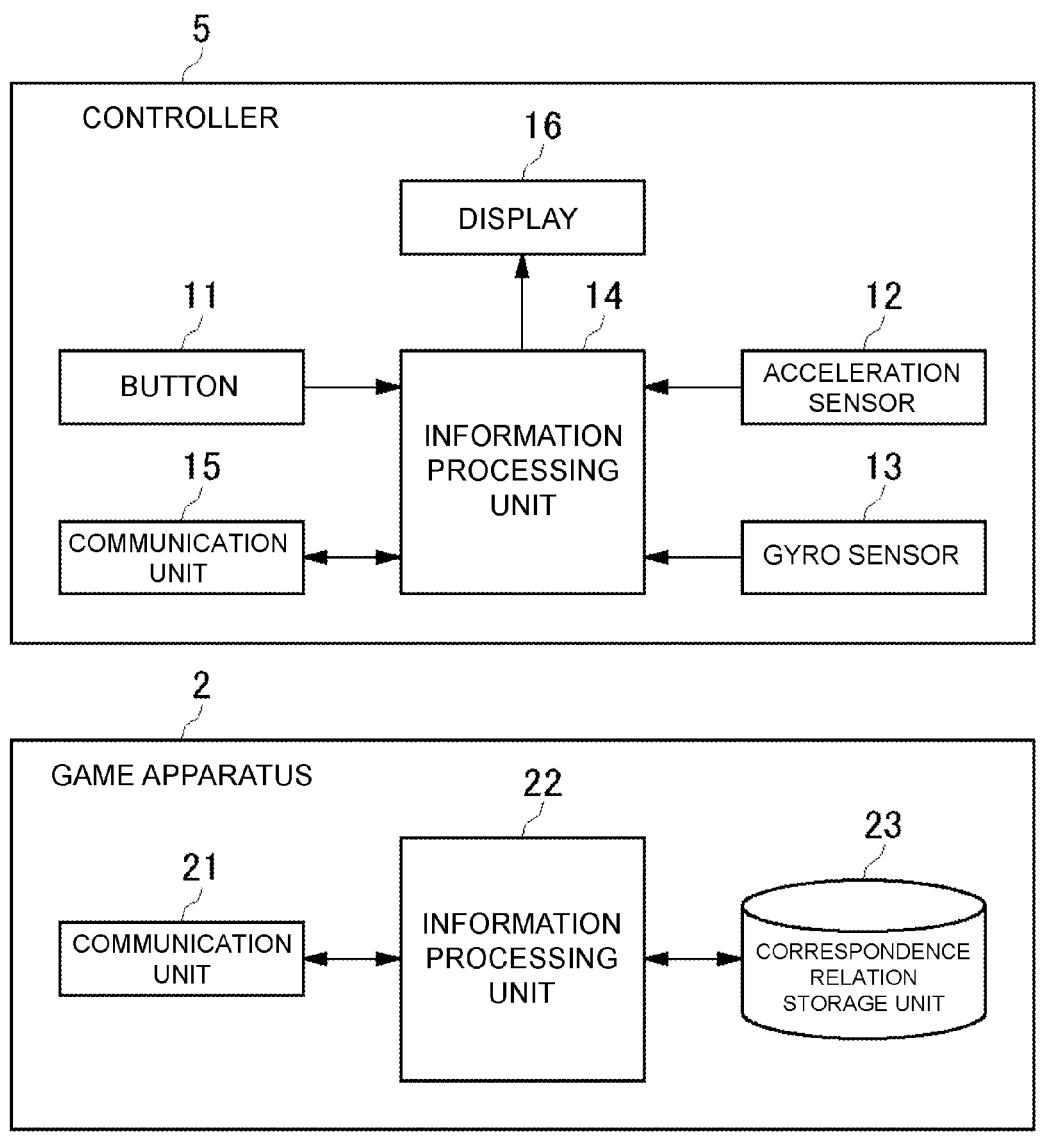
FIG. 3 shows a non-limiting example of a configuration of an information processing system.

FIG. 3 shows a non-limiting example of a configuration of the information processing system. The information processing system 10 of the embodiment includes the controller 5 and the game apparatus 2. The controller 5 includes a button 11, an acceleration sensor 12, a gyro sensor 13, an information processing unit 14, a communication unit 15, and a display unit 16. The game apparatus 2 includes a communication unit 21, an information processing unit 22, and a correspondence relation storage unit 23. The information processing system 10 of the embodiment illustrated in FIG. 3 includes the controller 5 and the game apparatus 2. However, the entire configuration of the information processing system 10 illustrated in FIG. 3 may be provided in the controller 5, and the information processing system 10 may be configured only by the controller 5. Furthermore, the information processing system 10 may not include the display unit 16. Further, in the case where the controller 5 and the game apparatus 2 are connected to each other via a wire, an interface for a wired connection may be provided instead of the communication unit 15.

The button 11 corresponds to the operation button of the controller 5. When the button 11 is operated, the button 11 outputs the operation information to the information processing unit 14. Furthermore, only one button 11 is depicted in FIG. 3, but a plurality of buttons 11 may be provided.

The acceleration sensor 12 detects an acceleration (including a gravity acceleration) occurring in the controller 5 and outputs acceleration data indicating the detected acceleration to the information processing unit 14. Since the acceleration detected by the acceleration sensor 12 changes in response to the posture (the inclination angle) or the shifting of the controller 5, the information processing unit 22 of the game apparatus 2 may calculate the posture or the shifting of the controller 5 by using the acceleration data.

The gyro sensor 13 detects the angular velocity about three axes set in the controller 5 and outputs angular velocity data indicating the detected angular velocity to the information processing unit 14. Since the angular velocity detected by the gyro sensor 13 changes in response to the posture (the inclination angle) or the shifting of the controller 5, the information processing unit 22 of the game apparatus 2 may calculate the posture or the shifting of the controller 5 by using the angular velocity data. In this way, the user may operate the game by pressing the operation button provided in the controller 5 and moving the controller 5 so as to change the posture (the inclination angle) thereof and/or shift the controller 5.

The information processing unit 14 is achieved in a manner such that a CPU (Central Processing Unit) executes the information processing program. The information processing unit 14 outputs information on the acceleration generated in the controller 5 detected by the acceleration sensor 12 and the angular velocity of the controller 5 detected by the gyro sensor 13 to the communication unit 15 and causes the communication unit 15 to transmit the information.

The communication unit 15 transmits various data including the acceleration or the angular velocity of the controller 5 according to the standard of Bluetooth (trademark) or IEEE802.11n to the game apparatus 2. Further, the communication unit 15 receives the image (the game image) of the virtual space where the game is developed from the game apparatus 2. The game image is obtained in a manner such that the game apparatus 2 operates the virtual camera based on the information of the acceleration or the angular velocity of the controller 5 received from the controller 5 and captures the virtual space by the virtual camera. The display unit 16 corresponds to the touch panel 51, and displays the game image received from the game apparatus 2.

The communication unit 21 of the game apparatus 2 receives the information transmitted from the communication unit 15 of the controller 5, and outputs the information to the information processing unit 22. The information processing unit 22 is achieved in a manner such that a CPU (Central Processing Unit) executes the information processing program of the embodiment. The information processing unit 22 calculates the movement (the posture and/or the shifting) of the controller 5 based on the information of acceleration or the angular velocity transmitted from the controller 5. The information processing unit 22 performs a calculation for operating the virtual camera in the virtual space in response to the calculated movement of the controller 5. Specifically, the information processing unit 22 calculates the capturing direction and/or the viewing point position of the virtual camera in the virtual space in response to the movement of the controller 5. The correspondence relation storage unit 23 stores the correspondence relation between the movement and/or the posture of the controller 5 and the capturing direction and/or the viewing point position of the virtual camera. When the information processing unit 22 calculates the movement and/or the posture of the controller 5, the information processing unit 22 obtains the capturing direction and/or the viewing point position of the virtual camera corresponding to the calculated movement and/or the posture of the controller 5 by referring to the correspondence relation storage unit 23. Here, the "movement" of the controller 5 includes an acceleration detected by the acceleration sensor 12 and an angular velocity detected by the gyro sensor 13. Further, the movement includes a speed obtained by integrating the acceleration detected by the acceleration sensor 12, and further includes a shifting amount (a relative position) obtained by twice integrating the acceleration detected by the acceleration sensor 12. Further, the "posture" of the controller 5 may be obtained by integrating the angular velocity, and is expressed based on the gravity direction. In the description below, a case will be exemplified in which the correspondence relation storage unit 23 stores the correspondence relation between the posture of the controller 5 and the capturing direction of the virtual camera and the information processing unit 22 obtains the capturing direction of the virtual camera based on the posture of the controller.

In the embodiment, the user may change the capturing direction of the virtual camera by changing the posture of the controller 5. In the description below, a case will be exemplified in which the virtual camera is rotated in the pitch direction (as the rotation about the horizontal axis (the camera axis) parallel to the capturing surface of the camera) by the rotation (the rotation about the lateral axis (the controller axis) when the user grips the controller 5) in the pitch direction of the controller 5. In this example, the correspondence relation storage unit 23 stores the correspondence relation between the pitch angle of the controller 5 and the pitch ratio of the virtual camera.

Here, in the embodiment, the pitch ratio of the virtual camera indicates a state where the virtual camera is directed upward and downward, and is a value which changes in the range of −1 to +1 in response to the viewing point position and the capturing direction of the camera. Furthermore, in the embodiment, the viewing point position of the virtual camera changes in response to the capturing direction thereof. In the embodiment, the position of the virtual camera is set to a comparatively low position in the vicinity of the pitch ratio of 1, and the position of the virtual camera is set to a comparatively high position in the vicinity of the pitch ratio of −1. Accordingly, the correspondence relation between the pitch ratio and the pitch angle of the controller 5 is expressed in the virtual camera instead of the pitch angle of the capturing direction. Furthermore, the viewing point position of the virtual camera may not be changed in response to a change in pitch ratio, but may be fixed. In this case, the pitch ratio corresponds to a change in the capturing direction of the virtual camera. Further, the capturing direction of the virtual camera may not be changed in response to a change in pitch ratio, but may be fixed. In this case, the pitch ratio corresponds to a change in the viewing point position.

Figure 4:
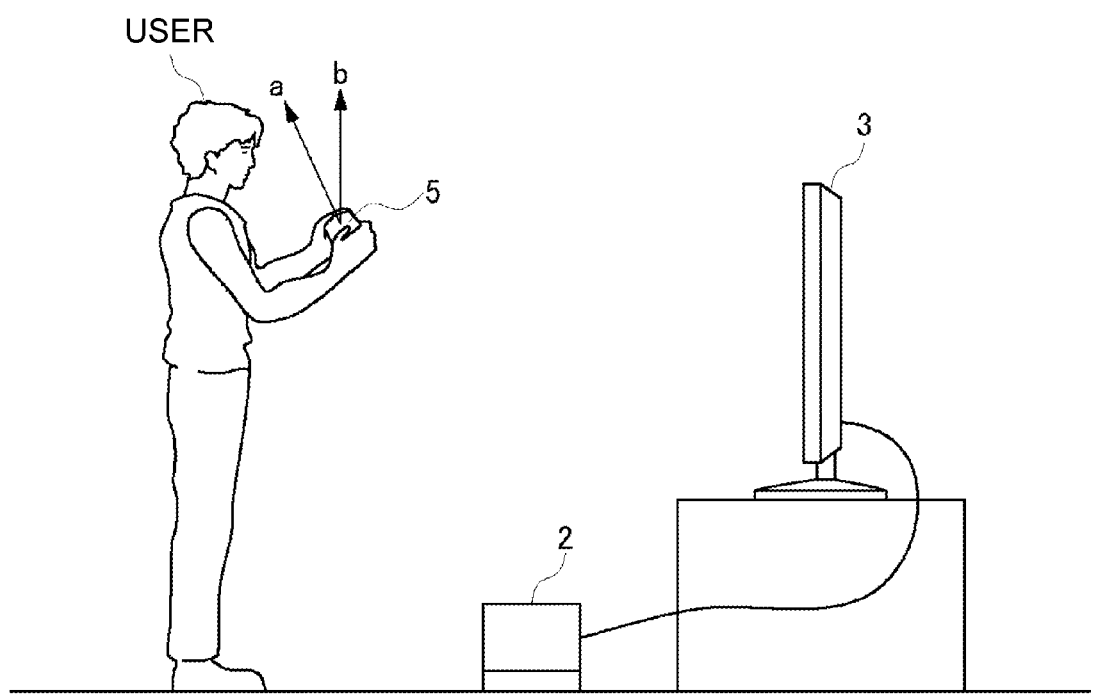
FIG. 4 shows a non-limiting example of a state where the user plays a game while gripping the controller.
Figure 5:
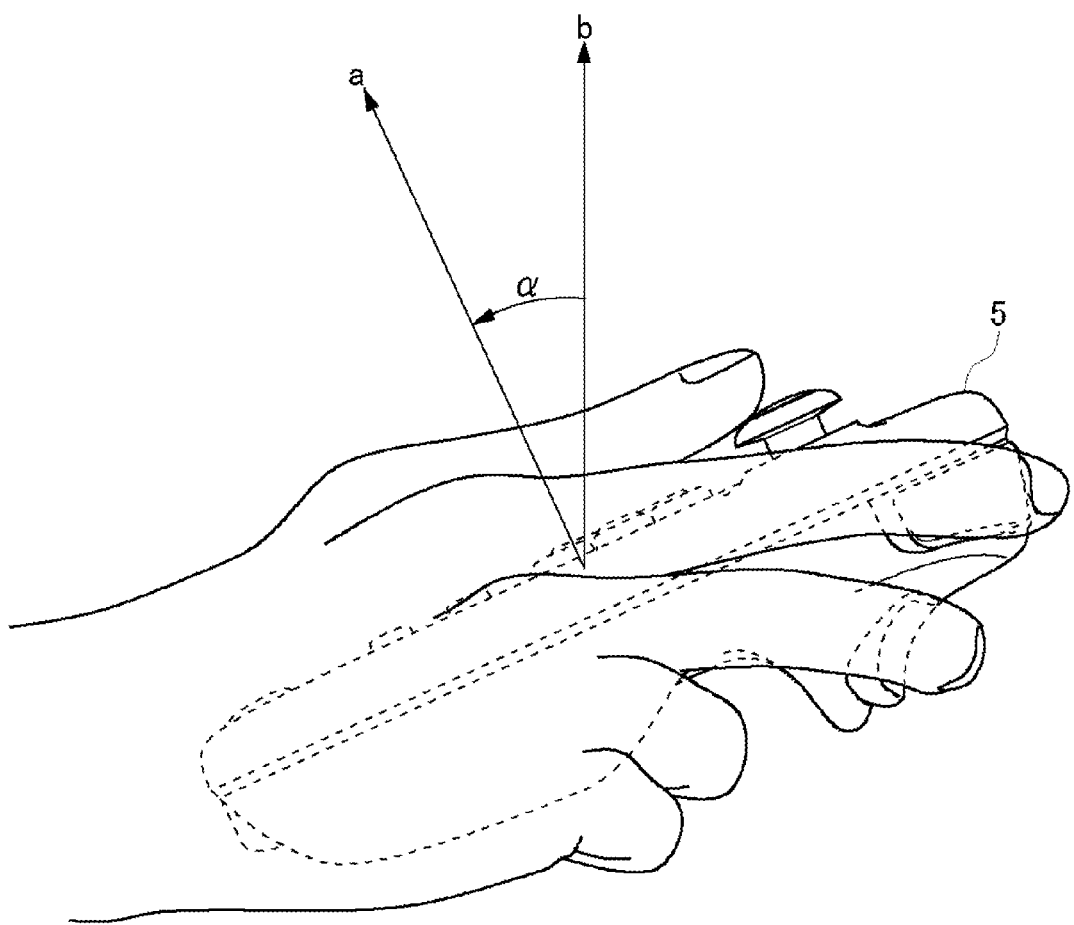
FIG. 5 shows a non-limiting example of a state where the user grips the controller.

FIG. 4 shows a non-limiting example of a state where the user plays a game while gripping the controller 5, and FIG. 5 shows a non-limiting example of a state where the user grips the controller 5. In the description below, as illustrated in FIGS. 4 and 5, an angle α formed between a direction a perpendicular to a (top) surface (a surface with the touch panel 51) of the controller 5 and an upward vertical direction b is defined as the pitch angle of the controller 5. That is, the pitch angle is 0° when the surface of the controller 5 is directed to the upside, and the pitch angle is set to 90° when the surface of the controller 5 is directed to the user.

In FIG. 4, the user plays a game in a standing state, but may play a game in a sitting state. Anyway, when the user takes a natural posture by gripping the controller 5, the surface of the controller 5 is not directed to the upside and is not directed in the perpendicular direction so as to be directed to the user. For example, as illustrated in FIG. 5, the posture becomes a posture in which the controller 5 is slightly inclined from a posture in which the surface is directed to the upside toward a posture in which the surface is directed to the user. That is, when the user takes a natural posture by gripping the controller 5, the pitch angle becomes about 20° to 30° although there is an individual difference according to the user.

Figure 6:
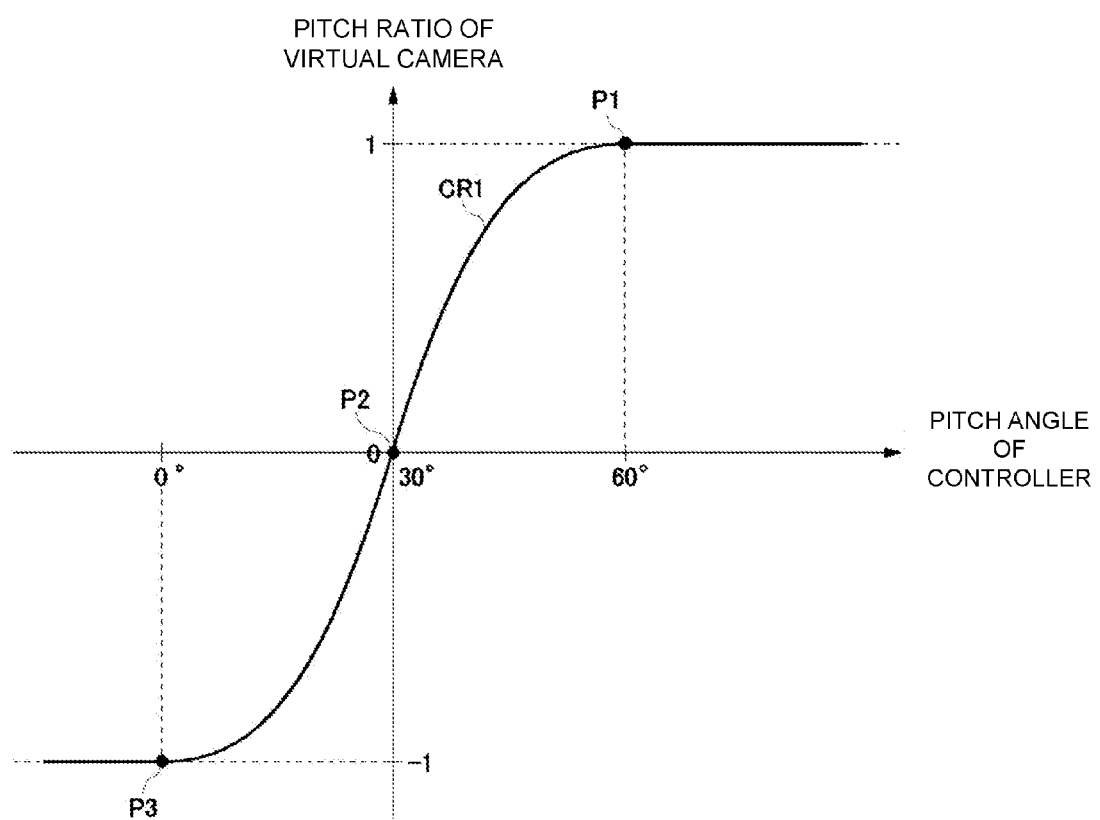
FIG. 6 shows a non-limiting example of a correspondence relation between a pitch ratio of a virtual camera and a pitch angle of the controller.

FIG. 6 shows a non-limiting example of a graph illustrating an example of the correspondence relation between the pitch ratio of the virtual camera and the pitch angle of the controller 5 stored in the correspondence relation storage unit 23. In a correspondence relation CR1 of this example, the pitch ratio of the virtual camera becomes 0 when the pitch angle of the controller is 30°. Here, in the embodiment, the pitch ratio of the virtual camera corresponds to the capturing direction of the virtual camera. For example, the pitch ratio of 1 corresponds to the case where the capturing direction of the virtual camera is directed to the upward vertical direction, the pitch ratio of −1 corresponds to the case where the capturing direction of the virtual camera is directed to the downward vertical direction, and the pitch ratio of 0 corresponds to the case where the capturing direction of the virtual camera is directed to the horizontal direction.

As illustrated in FIG. 6, the pitch ratio of the virtual camera changes in response to a change in the pitch angle of the controller 5, but the virtual camera may move only within the movable range of the pitch ratio of 1 to −1. The correspondence relation CR1 between the pitch angle of the controller 5 and the pitch ratio of the virtual camera may be a smooth approximate curve passing through a point P1 (60°, 1) where the pitch ratio of the virtual camera reaches the upper limit of the movable range, a point P2 (30°, 0)

where the pitch ratio is 0, and a point P3 (0°, −1) where the pitch ratio of the virtual camera reaches the lower limit of the movable range. For example, a Bezier curve, a quadratic function, a high-dimensional function, a sine function, or a non-linear function such as a logarithm function which passes through the three points may be employed. Further, the correspondence relation may be a linear function such as a straight line. Furthermore, a straight line may exist between P1 and P2 and/or between P2 and P3.

Even when the pitch ratio of the virtual camera reaches the limit of the movable range and the pitch angle of the controller 5 changes, the capturing direction and the viewing point position of the virtual camera may not be changed any more. In the example of FIG. 6, when the pitch angle of the controller 5 becomes 60°, the pitch ratio of the virtual camera becomes 1 as the limit of the movable range. Accordingly, even when the pitch angle of the controller 5 further increases, the pitch ratio of the virtual camera does not increase. Similarly, when the pitch angle of the controller 5 becomes 0°, the pitch ratio of the virtual camera becomes −1 as the limit of the movable range. Accordingly, even when the pitch angle of the controller 5 further decreases, the pitch ratio of the virtual camera does not decrease.

On the assumption that the correspondence relation CR1 between the pitch angle of the controller 5 and the pitch ratio of the virtual camera does not change, the pitch ratio of the virtual camera does not change until the pitch angle of the controller 5 becomes 60° even when, for example, the user returns the controller 5 so that the pitch angle decreases by inclining the controller 5 so that the pitch angle becomes 80°. As in the example of FIG. 6, when the pitch angle of the controller 5 is 30° corresponding to the case where the capturing direction of the virtual camera becomes horizontal and, for example, the user tries to change the pitch ratio of the virtual camera by inclining the controller 5 at the pitch angle of about 10° to 80°, the virtual camera may not be operated in the range of the pitch angle of 60° to 80°.

Therefore, in the embodiment, when the controller 5 is inclined so that the pitch ratio of the virtual camera reaches the limit of the movable range and the controller 5 is inclined so as to exceed a predetermined threshold value (a controller limit) with respect to the pitch angle, the correspondence relation between the pitch angle of the controller 5 and the pitch ratio of the virtual camera (hereinafter, simply referred to as a "correspondence relation") is changed. Here, the pitch angle larger than the pitch angle when the pitch ratio of the virtual camera becomes the upper limit of the movable range is set as an upper threshold value, and the pitch angle smaller than the pitch angle when the pitch ratio of the virtual camera becomes the lower limit of the movable range is set as a lower threshold value. When the pitch angle of the controller 5 becomes larger than the upper threshold value, the correspondence relation is changed. Further, when the pitch angle of the controller 5 becomes smaller than the lower threshold value, the correspondence relation is changed. In the embodiment, the threshold values with respect to the pitch angle (the posture) of the controller 5 match the pitch angle of the controller 5 when the pitch ratio of the virtual camera reaches the limit of the movable range. That is, when the pitch ratio of the virtual camera reaches the limit of the movable range and the controller 5 is further inclined, the correspondence relation is promptly changed. As a method of changing the correspondence relation, various methods may be used. Hereinafter, various examples of changing the correspondence relation will be described.

(Shift)

Figure 7:
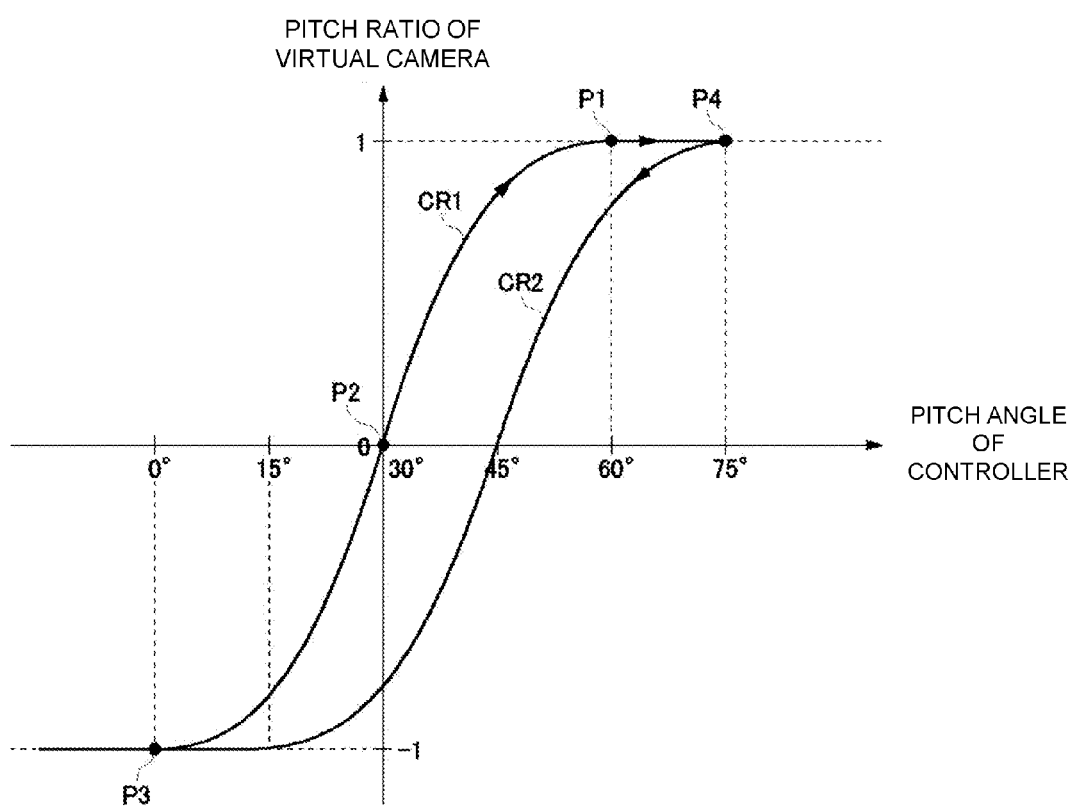
FIG. 7 shows a non-limiting example of a graph for a correspondence relation illustrating an example (a shift) of a method of changing the correspondence relation.

FIG. 7 shows a non-limiting example of a graph for the correspondence relation illustrating an example (a shift) of a method of changing the correspondence relation. In this example, the information processing unit 22 changes the original correspondence relation CR1 in the entire movable range so that the pitch angle of the controller 5 inclined and exceeding the controller limit corresponds to the limit of the movable range. Specifically, the information processing unit 22 shifts the correspondence relation in response to the degree in which the controller 5 is inclined so as to exceed the point P1 as the limit of the movable range of the pitch ratio when the controller 5 is inclined so as to exceed the threshold value (the posture of the controller 5 becomes the posture exceeding a predetermined threshold value). As illustrated in FIG. 7, when the pitch angle of the controller 5 further increases so as to exceed 60° of the point P1, the graph for the correspondence relation shifts rightward in response to the pitch angle of the controller 5.

As illustrated in FIG. 7, when the pitch angle of the controller 5 is inclined up to 75°, the controller is inclined by 15° over the limit of the movable range. For this reason, the correspondence relation CR1 is shifted by +15° in the entire movable range in the horizontal direction, and becomes a correspondence relation CR2. The correspondence relation CR1 and the correspondence relation CR2 have the same graph shape. By the shift, the pitch angle of 75° of the controller 5 may be correlated to the upper limit (the pitch ratio of 1) of the movable range of the pitch ratio of the virtual camera. Accordingly, when the inclination of the controller 5 is returned so that the pitch angle decreases from the point P4 of the pitch angle of 75°, the pitch ratio of the virtual camera changes in response to a change in the pitch angle of the controller 5 depending on the changed correspondence relation CR2. Then, when the pitch angle of the controller 5 becomes 45°, the pitch ratio of the virtual camera becomes 0, and the capturing direction of the virtual camera becomes the horizontal direction.

In the correspondence relation CR2 changed in this way, the limit of the movable range corresponds to the pitch angle of the controller 5 inclined and exceeding the controller limit. For this reason, when the controller 5 is inclined so as to exceed the controller limit and the pitch angle of the controller 5 is returned, the pitch ratio of the virtual camera promptly decreases with a decrease in the pitch angle of the controller 5.

When the controller 5 is inclined so as to exceed the threshold value of the pitch angle, the information processing unit 22 reads the correspondence relation CR1 stored in the correspondence relation storage unit 23, and obtains the correspondence relation CR2 by shifting the correspondence relation CR1 in response to the degree in which the controller 5 is inclined so as to exceed the limit P1 of the movable range of the virtual camera. Furthermore, the correspondence relation storage unit 23 may store the correspondence relation in which the correspondence relation CR1 is shifted in response to the degree in which the controller 5 is inclined so as to exceed the limit P1 of the movable range of the virtual camera, and the correspondence relation may be correlated to the degree in which the controller 5 is inclined so as to exceed the limit P1 of the movable range of the virtual camera. In this case, the information processing unit 22 changes the correspondence relation by reading the correspondence relation correlated to the degree in which the controller 5 is inclined so as to exceed the limit P1 of the movable range of the virtual camera in response to the degree.

As described above, according to the method of changing the correspondence relation, since the correspondence relation is shifted in the entire movable range of the virtual camera, it is possible to automatically adjust the posture of the controller 5 when the capturing direction of the virtual camera becomes the horizontal direction.

(Stretch)

Figure 8:
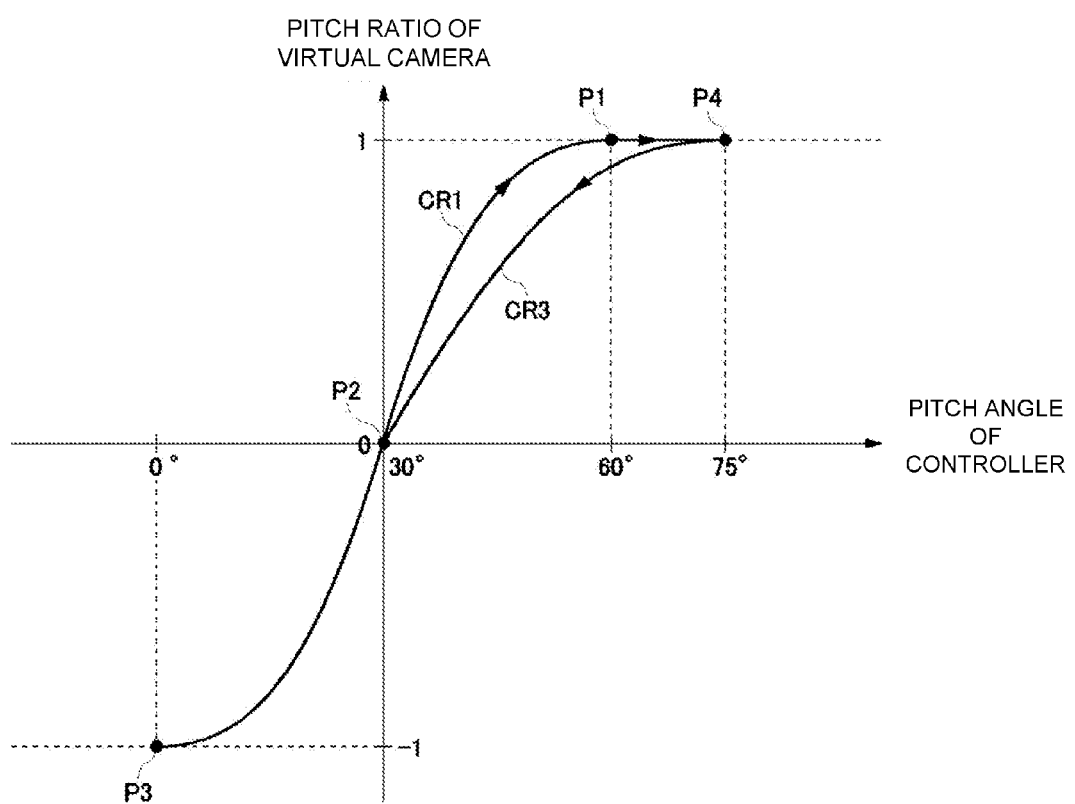
FIG. 8 shows a non-limiting example of a graph for a correspondence relation illustrating an example (a stretch) of a method of changing the correspondence relation.

FIG. 8 shows a non-limiting example of a graph for the correspondence relation illustrating an example (a stretch) of a method of changing the correspondence relation. Even in this example, the information processing unit 22 changes the correspondence relation so that the pitch angle of the controller 5 inclined and exceeding the threshold value of the pitch angle is correlated to the limit of the movable range of the virtual camera. However, in this example, a correspondence relation CR3 is obtained by stretching the graph of the correspondence relation so that the limit of the movable range of the virtual camera is correlated to the pitch angle of the controller 5 inclined and exceeding the threshold value while keeping the correspondence relation of the fixed point P2 (20°, 0) where the pitch ratio becomes 0 (the capturing direction of the virtual camera becomes the horizontal direction).

Even in this example, when the pitch angle of the controller 5 is returned after the controller 5 is inclined so as to exceed the threshold value of the pitch angle, the pitch ratio of the virtual camera changes in response to the pitch angle of the controller 5 according to the changed correspondence relation CR3. In the changed correspondence relation CR3, since the limit of the movable range of the virtual camera corresponds to the pitch angle of the controller 5 inclined and exceeding the threshold value, the pitch ratio of the virtual camera promptly decreases with a decrease in the pitch angle of the controller 5 when the pitch angle of the controller 5 is returned after the controller 5 is inclined so as to exceed the threshold value.

The correspondence relation storage unit 23 stores the correspondence relation (the correspondence relation obtained by stretching the correspondence relation CR1) set in response to the degree in which the controller 5 is inclined so as to exceed the limit P1 of the movable range of the virtual camera, and the correspondence relation is correlated to the degree in which the controller 5 is inclined so as to exceed the limit P1 of the movable range of the virtual camera. The information processing unit 22 changes the correspondence relation by reading the correspondence relation correlated to the degree in which the controller 5 is inclined so as to exceed the limit P1 of the movable range of the virtual camera in response to the degree. Each correspondence relation stored in the correspondence relation storage unit 23 is also obtained as a Bezier curve or the like passing through three points where the limit (the upper limit and the lower limit) of the movable range of the virtual camera and the pitch ratio become 0 similarly to the correspondence relation CR1, and is stored in the correspondence relation storage unit 23. Furthermore, the information processing unit 22 may calculate the correspondence relation whenever the controller 5 is inclined so as to exceed the limit P1 of the movable range of the virtual camera in response to each degree.

As described above, according to the method of changing the correspondence relation, since the posture (the reference posture) of the controller 5 of when the pitch ratio becomes 0 does not change, that is, the capturing direction of the virtual camera becomes the horizontal direction, it is possible to prevent the uncomfortable feeling of the user due to the frequent change of the reference posture.

As described above, when the pitch angle of the controller 5 is returned after the controller 5 is inclined so as to exceed the limit P1 of the movable range of the virtual camera, the pitch ratio may be changed in response to the pitch angle of the controller 5 according to the changed correspondence relation CR3 until the pitch ratio of the virtual camera becomes 0, but the correspondence relation may be gradually returned to the original correspondence relation CR1.

Figure 9:
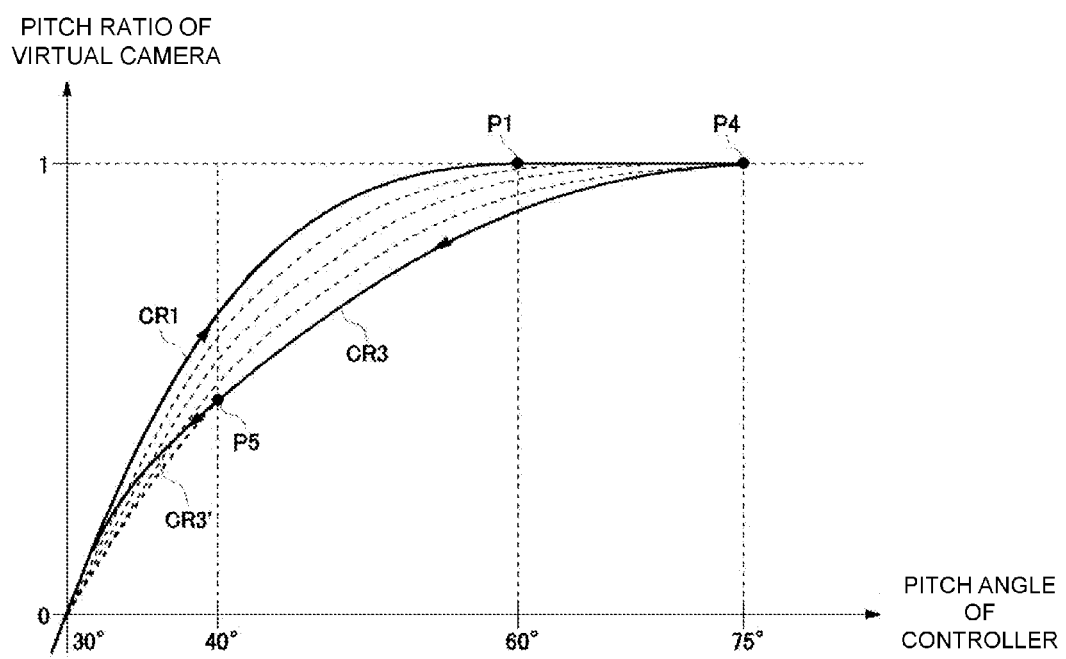
FIG. 9 shows a non-limiting example of a graph illustrating the correspondence relation when the correspondence relation is gradually returned.

FIG. 9 shows a non-limiting example of a graph illustrating the correspondence relation when the correspondence relation is gradually returned. In the example of FIG. 9, when the pitch angle of the controller 5 is lower than the change limit P5 as 40°, the pitch ratio of the virtual camera changes in accordance with the correspondence relation changed in the case where the degree in which the controller 5 is inclined so as to exceed the limit P1 of the movable range of the virtual camera is comparatively small instead of the correspondence relation CR3. Then, the pitch ratio of the virtual camera changes along the changed correspondence relation in the case where the degree in which the controller 5 is inclined so as to exceed the limit P1 of the movable range of the virtual camera is small as the pitch ratio becomes smaller than the change limit P5 and approaches the pitch angle of 30° corresponding to the pitch ratio 0, and the correspondence relation in which the pitch angle becomes 30° is set as the original correspondence relation CR1. That is, when the pitch angle of the controller 5 exceeds the change limit P5 and decreases toward the point where the pitch ratio becomes 0, the correspondence relation is changed so that a change in correspondence relation gradually decreases. Furthermore, the point returned to the original correspondence relation CR1 may not be the point (the point where the pitch angle of the controller 5 becomes 30°) where the pitch ratio of the virtual camera becomes 0. For example, the correspondence relation may be returned to the original correspondence relation CR1 by the point where the pitch angle of the controller becomes 15°.

By such a change in correspondence relation, as illustrated in FIG. 9, when the pitch ratio of the virtual camera approaches 0 with a decrease in the pitch angle of the controller 5, the pitch ratio of the virtual camera decreases in response to the pitch angle of the controller 5 along the curve CR3' after reaching the change limit P5. If the controller 5 is inclined so that the pitch ratio of the controller 5 increases again when the pitch angle of the controller 5 is decreasing and the pitch ratio of the virtual camera is decreasing along the curve CR3', the pitch ratio of the virtual camera increases along the correspondence relation at that time. Furthermore, in FIG. 9, three correspondence relations are representatively depicted between the correspondence relation CR1 and the correspondence relation CR3, but there are many correspondence relations in actual. Then, the correspondence relation which is close to the correspondence relation CR1 is employed with a decrease in the pitch angle of the controller 5.

Furthermore, in the above-described example, in the case where the original correspondence relation CR1 is stretched and changed, the fixed position is the point where the pitch ratio of the virtual camera becomes 0, but the fixed point may be the point where the pitch ratio of the virtual camera corresponds to an arbitrary value within the movable range. Further, the fixed position is not limited to the point, and may be a range having a predetermined width. For example, the original correspondence relation CR1 is maintained in the range where the pitch ratio of the virtual camera is −0.3 to 0.3, and the correspondence relation may be changed outside this range.

Further, in the above-described example, the correspondence relation changes so as to gradually approach the original correspondence relation CR1 as the pitch angle of the controller 5 becomes smaller than the change limit P5. However, instead of this configuration, the correspondence relation may be changed so as to gradually approach the original correspondence relation CR1 in response to the pitch angle decrease speed of the controller 5. Further, when the pitch angle of the controller 5 becomes larger than the threshold value and the pitch angle is returned, the change limit P5 may be set so as to change in response to the pitch angle decrease speed. For example, when the pitch angle decrease speed is large (that is, the posture is suddenly returned to the original posture), the change limit of the pitch angle may be set to the higher value. Further, the correspondence relation may start to be promptly and gradually changed so as to follow the closer correspondence relation by the correspondence relation CR1 when the pitch angle of the controller 5 is started to be returned without preparing the change limit P5. In other words, the point where the pitch angle of the controller 5 starts to be returned may be the change limit P5.

(Shift after Stretch)

Figure 10:
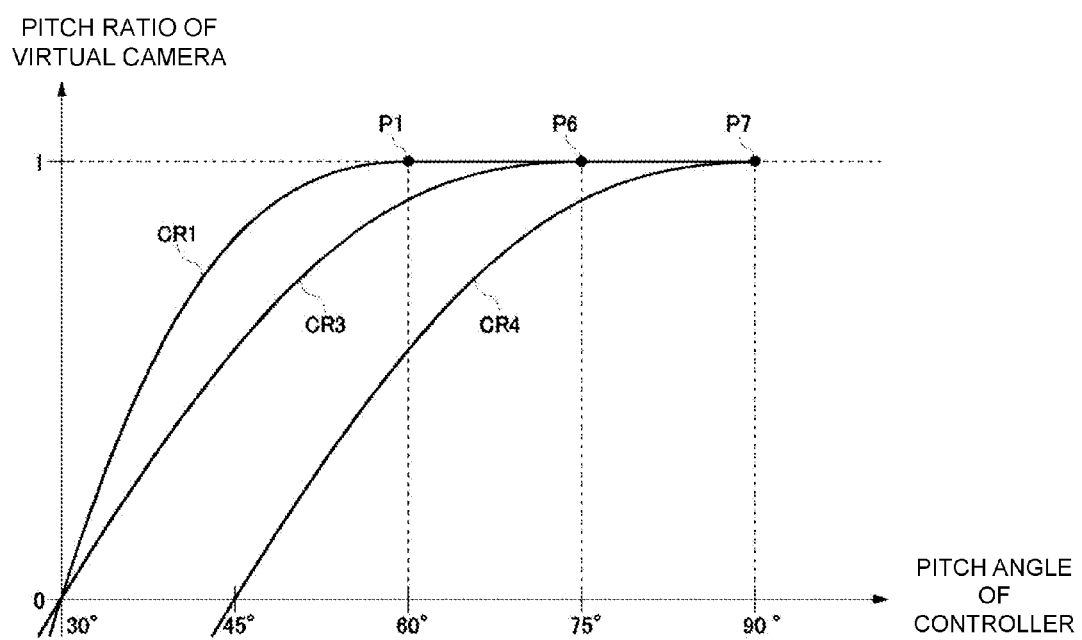
FIG. 10 shows a non-limiting example of a graph for the correspondence relation illustrating an example (a shift after a stretch) of a method of changing the correspondence relation.

FIG. 10 shows a non-limiting example of a graph for the correspondence relation illustrating an example (a shift after a stretch) of a method of changing the correspondence relation. Even in this example, the information processing unit 22 changes the correspondence relation so that the pitch angle of the controller 5 inclined so as to exceed the controller limit P1 is correlated to the limit of the movable range of the virtual camera. In this example, the information processing unit 22 first stretches the graph of the correspondence relation so that the limit of the movable range of the virtual camera corresponds to the pitch angle of the controller 5 inclined so as to exceed the threshold value while maintaining the correspondence relation of the fixed point P2 (20°, 0) where the pitch ratio becomes 0 (the capturing direction of the virtual camera becomes horizontal). When the controller 5 reaches the second threshold value (the stretch limit) P6 larger than the controller limit P1 so as to be stretched to the correspondence relation CR3 and the controller 5 is further inclined so as to exceed the stretch limit P6, the correspondence relation CR3 is shifted in the entire movable range so that the pitch angle of the controller 5 is correlated to the limit of the movable range of the virtual camera.

In FIG. 10, an example is illustrated in which the controller 5 exceeds the point P6 of 75° as the stretch limit and is inclined to the point P7 of 90° so as to follow a correspondence relation CR4. The correspondence relation CR4 is obtained by shifting the correspondence relation CR3 in the direction of the pitch angle of the controller 5 by +15°. Accordingly, when the pitch angle of the controller 5 becomes 45°, the pitch ratio of the virtual camera becomes 0.

(Stretch after Shift)

Figure 11:
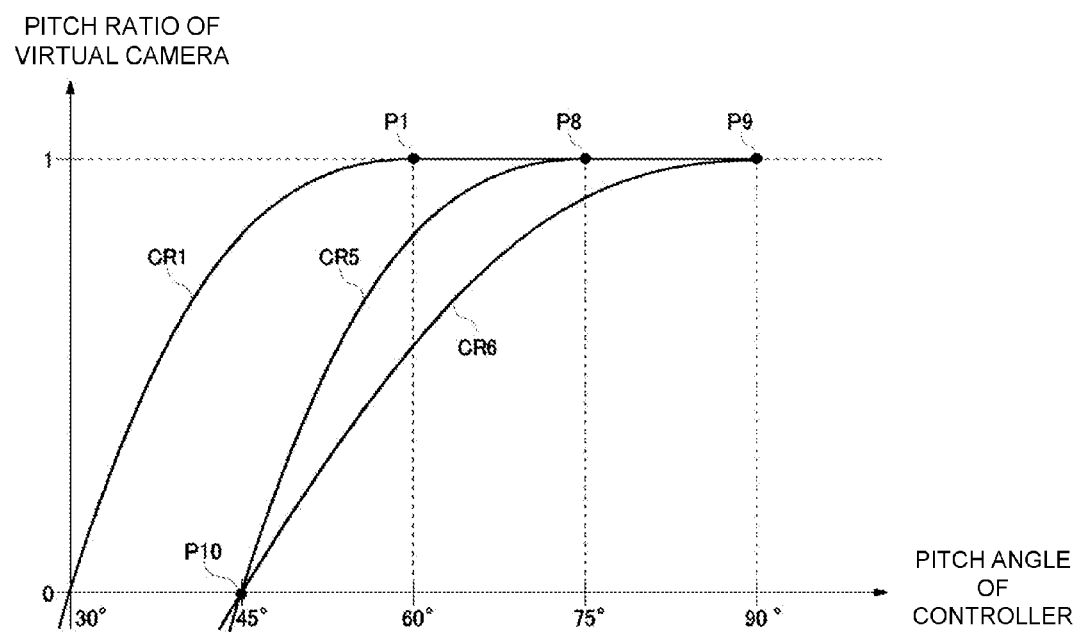
FIG. 11 shows a non-limiting example of a graph for the correspondence relation illustrating an example (a stretch after a shift) of a method of changing the correspondence relation.

FIG. 11 shows a non-limiting example of a graph for the correspondence relation illustrating an example (a stretch after a shift) of a method of changing the correspondence relation. Even in this example, the information processing unit 22 changes the correspondence relation so that the pitch angle of the controller 5 inclined so as to exceed the limit P1 of the movable range of the virtual camera is correlated to the limit of the movable range of the virtual camera. In this example, the information processing unit 22 first shifts the original correspondence relation CR1 in the entire movable range so that the pitch angle of the controller 5 is correlated to the limit of the movable range of the virtual camera. When the controller 5 reaches the second threshold value (the shift limit) P8 larger than the threshold value corresponding to the limit P1 of the movable range of the virtual camera so as to be shifted to the correspondence relation CR5 and the controller 5 is further inclined so as to exceed the shift limit P8, the graph of the correspondence relation CR5 is stretched so that the limit of the movable range corresponds to the pitch angle of the controller 5 inclined so as to exceed the shift limit P8 while maintaining the correspondence relation of the fixed point P10 (45°, 0) where the pitch ratio becomes 0 (the capturing direction of the virtual camera becomes horizontal).

In FIG. 11, an example is illustrated in which the controller 5 exceeds the point P8 of 75° as the shift limit and is inclined to the point P9 of 90° so as to follow the correspondence relation CR6. The correspondence relation CR6 is obtained by stretching the correspondence relation CR5 in the direction of the pitch angle of the controller 5. Accordingly, when the pitch angle of the controller 5 becomes 45°, the pitch ratio of the virtual camera becomes 0.

In the four examples of the method of changing the correspondence relation described above, a case has been described in which the correspondence relation is changed when the pitch angle of the controller 5 increases and reaches the upper limit of the movable range of the virtual camera. However, even in the case where the pitch angle of the controller 5 decreases and reaches the lower limit of the movable range of the virtual camera, the correspondence relation may be changed as described above.

(Reset)

The user may reset the correspondence relation by operating a reset button. The information processing unit 22 sets the pitch ratio of the virtual camera to 0 at the pitch angle of the controller 5 in response to the detection of the predetermined operation of button (the operation of pressing the reset button) of the button 11. Accordingly, when the user presses the reset button of the controller 5, the posture (the pitch angle) of the controller 5 at that time becomes the reference posture, and is correlated to the state where the capturing direction of the virtual camera becomes the horizontal direction. Furthermore, the graph of the correspondence relation at this time has the same shape as the correspondence relation CR1.

The information processing unit 22 obtains the pitch ratio of the virtual camera in response to the pitch angle of the controller 5 in accordance with the correspondence relation changed as described above. The information processing unit 22 develops a game in a three-dimensional virtual space, generates the captured image (that is, the game image of the virtual space) of the virtual camera in accordance with the calculated pitch ratio of the virtual camera, and transmits the captured image to the monitor 3 and the controller 5. The monitor 3 and the touch panel 51 of the controller 5 display the captured image received from the game apparatus 2.

As described above, according to the information processing system 10 of the embodiment, since the correspondence relation between the movement of the controller 5 and the movement of the virtual camera is not fixed, it is possible to improve the operability of the virtual camera even when the virtual camera exceeds the limit of the movable range and the posture of the controller 5 becomes a posture exceeding the threshold value.

Furthermore, in the above-described embodiment, an example is illustrated in which the pitch ratio of the virtual camera changes in response to the rotation of the controller 5 in the pitch direction, but the pitch ratio of the virtual camera may be changed in response to the movement (a change in position (shifting) or a change in posture) of the controller 5. As described above, a change in posture or shifting in the real space of the controller 5 may be calculated by the information processing unit 22 using the acceleration sensor 12 or the gyro sensor 13. In this case, the correspondence relation storage unit 23 stores the correspondence relation between the movement of the controller 5 and the capturing direction and/or the viewing point position of the virtual camera, and the information processing unit 22 changes the correspondence relation when the virtual camera exceeds the limit of the movable range and the position or the posture of the controller 5 is operated so as to exceed the threshold value. Further, the viewing point position of the virtual camera in the virtual space may be moved in response to the movement or the posture of the controller 5, and the capturing direction of the virtual camera may be changed in response to the shifting or the posture of the controller 5.

Further, in the above-described embodiment, the game apparatus 2 and the controller 5 including the touch panel 51 are formed as separate members, but may be integrated with each other to constitute a portable game apparatus. Further, the controller 5 may not include the touch panel 51.

Further, in the above-described embodiment, the posture or the shifting of the controller 5 is calculated by using the acceleration sensor 12 or the gyro sensor 13, but the posture or the shifting of the controller 5 may be calculated according to the other method. For example, the posture or the shifting of the controller 5 may be calculated in a manner such that the controller 5 is provided with a camera, the monitor 3 is provided with two LED modules as markers, the two markers are captured by the camera of the controller 5, and the captured image is analyzed.

Further, in the above-described embodiment, the controller limit used to change the correspondence relation matches the limit of the movable range of the virtual camera. However, the controller limit may be set to an angle larger than the pitch angle corresponding to the upper limit of the movable range of the virtual camera, and may be set to an angle smaller than the pitch angle corresponding to the lower limit of the movable range of the virtual camera. That is, the correspondence relation may be changed when the controller 5 exceeds the pitch angle corresponding to the limit of the movable range of the virtual camera and is further inclined by a predetermined angle. In this way, when the controller 5 is inclined so as to slightly exceed the pitch angle corresponding to the limit of the movable range of the virtual camera and the posture of the controller 5 is promptly returned, the correspondence relation is not changed. Since the user may check that the pitch angle reaches the limit of the movable range of the virtual camera on the screen of the monitor 3 or the touch panel 51, the posture of the controller 5 may be promptly returned to the original posture in such a state. However, in such a case, the correspondence relation is not changed. Accordingly, it is possible to suppress degradation in operability or process load due to the frequent change of the correspondence relation.

Further, in the above-described embodiment, the correspondence relation is changed so that the limit of the movable range matches the pitch angle of the controller 5 when the pitch angle of the controller 5 exceeds the pitch angle corresponding to the limit of the movable range of the virtual camera, but the method of changing the correspondence relation is not limited thereto. For example, the correspondence relation may be changed so that the limit of the movable range matches the pitch angle (for example, the pitch angle between both pitch angles) between the pitch angle corresponding to the limit of the movable range of the virtual camera and the pitch angle of the controller 5 inclined so as to exceed the angle. In this way, the pitch ratio of the virtual camera is not promptly changed when the posture of the controller 5 is inclined to return to the original posture after the controller 5 is inclined so as to exceed the limit of the movable range of the virtual camera. However, the pitch ratio of the virtual camera promptly changes in response to a change in the posture of the controller 5 compared to the case where the correspondence relation is not changed at all.

Further, in the above-described embodiment, the correspondence relation is changed in multiple ways in response to the pitch angle of the controller 5 inclined so as to exceed the limit of the movable range of the virtual camera, but the changed correspondence relation may be one way. Further, in the above-described embodiment, the correspondence relation is continuously changed so that the pitch angle of the controller 5 inclined so as to exceed the limit of the movable range of the virtual camera matches the limit of the changed correspondence relation. However, the correspondence relation may be gradually changed in response to the degree in which the controller 5 is inclined so as to exceed the limit of the movable range of the virtual camera. In this case, the correspondence relation between the range of the degree in which the controller 5 is inclined so as to exceed the limit of the movable range of the virtual camera and the changed correspondence relation is stored in the table, and the changed correspondence relation may be obtained by referring to the table.

Further, in the above-described embodiment, the angle difference ($|60°-30°|=30°$) between the pitch angle of the controller 5 where the pitch ratio of the virtual camera becomes 0 (the capturing direction becomes horizontal) and the pitch angle of the controller 5 corresponding to the upper limit of the movable range of the virtual camera is equal to the angle difference ($|0°-30°|=30°$) between the pitch angle of the controller 5 where the pitch ratio of the virtual camera becomes 0 and the pitch angle of the controller 5 corresponding to the lower limit of the movable range of the virtual camera, but the present technology is not limited thereto. For example, the angle difference between the pitch angle of the controller 5 where the pitch ratio of the virtual camera becomes 0 and the pitch angle of the controller 5 corresponding to the upper limit of the movable range of the virtual camera may be larger or smaller than the angle difference between the pitch angle of the controller 5 where the pitch ratio of the virtual camera becomes 0 and the pitch angle of the controller 5 corresponding to the lower limit of the movable range of the virtual camera.

Further, in the above-described embodiment, the state where the capturing direction of the virtual camera becomes the horizontal direction is correlated to the pitch ratio of 0. However, the state where the capturing direction of the virtual camera has a predetermined pitch angle with respect to the horizontal direction may be correlated to the pitch ratio of 0.

Further, as described above, the information processing unit 22 and the correspondence relation storage unit 23 of the information processing system 10 may be provided in the controller 5. In this case, the information processing system 10 is configured only by the controller 5.

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-designed ASICs (application specific integrated circuits) and/or logic circuitry. In the case of a distributed processor architecture or arrangement, appropriate data exchange and transmission protocols are used to provide low latency and maintain interactivity, as will be understood by those skilled in the art.

Similarly, program instructions, data and other information for implementing the systems and methods described herein may be stored in one or more on-board and/or removable memory devices. Multiple memory devices may be part of the same device or different devices, which are co-located or remotely located with respect to each other.

While certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. An information processing system comprising:
   a sensor configured to detect aspects of posture of a controller; and
   a processing system in communication with the sensor and including at least one hardware processor, the processing system being configured to control a parameter of a virtual camera in a virtual space, within a predetermined parameter range, based on a correspondence relation between the parameter of the virtual camera and posture of the controller,
   wherein, when the detected posture of the controller exceeds a posture of the controller for causing the virtual camera to reach an upper limit of the parameter range, the processing system is configured to change a current correspondence relation and to thereafter control the parameter of the virtual camera in the virtual space in accordance with the changed correspondence relation, and
   wherein, when the detected posture of the controller exceeds a posture of the controller for causing the virtual camera to reach a lower limit of the parameter range, the processing system is configured to change a current correspondence relation and to thereafter control the parameter of the virtual camera in the virtual space in accordance with the changed correspondence relation.

2. The information processing system according to claim 1,
   wherein the processing system is configured to generate an image captured by the virtual camera and output the captured image to a display.

3. The information processing system according to claim 2, wherein the information processing system further comprises the display.

4. The information processing system according to claim 1,
   wherein the processing system is configured to operate the virtual camera in response to detected aspects of posture resulting from rotation of the controller about a controller axis.

5. The information processing system according to claim 4,
   wherein the rotation of the controller is rotation in a pitch direction.

6. The information processing system according to claim 1,
   wherein the processing system is configured to operate the virtual camera in response to detected aspects of posture resulting from shifting of the controller.

7. The information processing system according to claim 1,
   wherein the processing system is configured to shift the virtual camera in the virtual space.

8. The information processing system according to claim 1,
   wherein the processing system is configured to change the current correspondence relation, when the detected posture of the controller exceeds, by a first amount, the posture of the controller for causing the virtual camera to reach the upper limit of the parameter range, and
   wherein the processing system is configured to change the current correspondence relation, when the detected posture of the controller exceeds, by a second amount, the posture of the controller for causing the virtual camera to reach the lower limit of the parameter range.

9. The information processing system according to claim 8,
   wherein the processing system is configured to correlate the posture of the controller operated so as to exceed, by the first amount, the posture of the controller for causing the virtual camera to reach the upper limit of the parameter range, or by the second amount, the posture of the controller for causing the virtual camera to reach the lower limit of the parameter range.

10. The information processing system according to claim 1,
    wherein the processing system is configured to change the current correspondence relation in response to a degree to which the detected posture of the controller changes after the virtual camera reaches the upper limit of the parameter range or after the virtual camera reaches the lower limit of the parameter range.

11. The information processing system according to claim 1,
    wherein the processing system is configured to change the current correspondence relation for the entire parameter range.

12. The information processing system according to claim 11,
    wherein the processing system is configured to shift the current correspondence relation in a direction corresponding to a direction in which the detected posture of the controller changes.

13. The information processing system according to claim 1,
wherein the processing system is configured to change the current correspondence relation at positions other than a predetermined fixed position within the parameter range while maintaining the correspondence relation at the fixed position.

14. The information processing system according to claim 13,
wherein the processing system is configured to stretch the current correspondence relation in a direction corresponding to a direction in which the detected posture of the controller changes.

15. The information processing system according to claim 13,
wherein the fixed position corresponds to a point at which the parameter of the virtual camera becomes a predetermined value.

16. The information processing system according to claim 1,
wherein, when the detected posture of the controller exceeds the posture of the controller for causing the virtual camera to reach the upper limit of the parameter range, the current correspondence relation is changed at positions other than a fixed position within the parameter range, while the correspondence relation at the fixed position remains the same,
wherein, when the detected posture of the controller exceeds the posture of the controller for causing the virtual camera to reach the lower limit of the parameter range, the current correspondence relation is changed at positions other than a fixed position within the parameter range, while the correspondence relation at the fixed position remains the same, and
wherein the processing system is configured to
change the current correspondence relation in the entire parameter range when the controller is further operated so as to exceed, by a first amount, the posture of the controller for causing the virtual camera to reach the upper limit of the parameter range, or by a second amount, the posture of the controller for causing the virtual camera to reach the lower limit of the parameter range.

17. The information processing system according to claim 16,
wherein, when the detected posture of the controller exceeds the posture of the controller for causing the virtual camera to reach the upper limit of the parameter range, the current correspondence relation is changed at positions other than the fixed position in response to a degree to which the controller is operated so as to exceed the posture of the controller for causing the virtual camera to reach the upper limit of the parameter range,
wherein, when the detected posture of the controller exceeds the posture of the controller for causing the virtual camera to reach the lower limit of the parameter range, the current correspondence relation is changed at positions other than the fixed position in response to a degree to which the controller is operated so as to exceed the posture of the controller for causing the virtual camera to reach the lower limit of the parameter range and
wherein the processing system is configured to
change the current correspondence relation in the entire parameter range in response to a degree to which the controller is operated so as to exceed, by the first amount, the posture of the controller for causing the virtual camera to reach the upper limit of the parameter range, or by the second amount, the posture of the controller for causing the virtual camera to reach the lower limit of the parameter range.

18. The information processing system according to claim 1,
wherein, when the detected posture of the controller exceeds the posture of the controller for causing the virtual camera to reach the upper limit of the parameter range, the current correspondence relation is changed for the entire parameter range,
wherein, when the detected posture of the controller exceeds the posture of the controller for causing the virtual camera to reach the lower limit of the parameter range, the current correspondence relation is changed for the entire parameter range, and
wherein the processing system is configured to
change the current correspondence relation at positions other than a predetermined fixed position within the parameter range while maintaining the current correspondence relation at the fixed position when the detected posture of the controller exceeds, by a first amount, the posture of the controller for causing the virtual camera to reach the upper limit of the parameter range, or by a second amount, the posture of the controller for causing the virtual camera to reach the lower limit of the parameter range.

19. The information processing system according to claim 18,
wherein, when the detected posture of the controller exceeds the posture of the controller for causing the virtual camera to reach the upper limit of the parameter range, the current correspondence relation is changed in the entire parameter range in response to a degree to which the controller is operated so as to exceed the posture of the controller for causing the virtual camera to reach the upper limit of the parameter range,
wherein, when the detected posture of the controller exceeds the posture of the controller for causing the virtual camera to reach the lower limit of the parameter range, the current correspondence relation is changed for the entire parameter range in response to a degree to which the controller is operated so as to exceed the posture of the controller for causing the virtual camera to reach the lower limit of the parameter range, and
wherein the processing system is configured to change the current correspondence relation at positions other than the fixed position in response to a degree to which the controller is operated so as to exceed, by the first amount, the posture of the controller for causing the virtual camera to reach the upper limit of the parameter range, or by the second amount, the posture of the controller for causing the virtual camera to reach the lower limit of the parameter range.

20. The information processing system according to claim 1,
wherein the processing system is configured to operate the virtual camera in response to the detected posture of the controller in accordance with the changed correspondence relation when the controller is operated in a direction opposite to the predetermined direction after the correspondence relation is changed.

21. The information processing system according to claim 1,
wherein the parameter of the virtual camera is correlated to a posture of the controller in response to a predetermined operation performed on the controller.

22. The information processing system according to claim 1,
wherein the controller comprises the information processing system.

23. The information processing system according to claim 1, wherein the parameter of the virtual camera comprises a capturing direction of the virtual camera in the virtual space.

24. The information processing system according to claim 23,
wherein the processing system is configured to control the capturing direction of the virtual camera by rotation of the virtual camera about a camera axis in the virtual space.

25. The information processing system according to claim 24,
wherein the rotation of the virtual camera is rotation in a pitch direction in the virtual space.

26. The information processing system according to claim 1, wherein the parameter of the virtual camera comprises a position of the virtual camera in the virtual space.

27. A non-transitory computer-readable storage medium having stored therein an information processing program for controlling a virtual camera in a virtual space in accordance with posture of a controller,
the information processing program causing a computer to detect aspects of posture of the controller, and control a parameter of the virtual camera in a virtual space, within a predetermined parameter range, based on a correspondence relation between the parameter of the virtual camera and posture of the controller,
wherein, when the detected posture of the controller exceeds a posture of the controller for causing the virtual camera to reach an upper limit of the parameter range, the program causes the computer to change a current correspondence relation and to thereafter control the parameter of the virtual camera in the virtual space in accordance with the changed correspondence relation, and
wherein, when the detected posture of the controller exceeds a posture of the controller for causing the virtual camera to reach a lower limit of the parameter range, the program causes the computer to change a current correspondence relation and to thereafter control the parameter of the virtual camera in the virtual space in accordance with the changed correspondence relation.

28. An information processing apparatus for controlling a parameter of a virtual camera in a virtual space in accordance with posture of a controller,
wherein the information processing apparatus comprises a sensor configured to detect aspects of posture of the controller, and a processor configured to control a parameter of the virtual camera in the virtual space, within a predetermined parameter range, based on a correspondence relation between the parameter of the virtual camera and posture of the controller,
wherein, when the detected posture of the controller exceeds a posture of the controller for causing the virtual camera to reach an upper limit of the parameter range, the processor is configured to change a current correspondence relation and to thereafter control the parameter of the virtual camera in the virtual space in accordance with the changed correspondence relation, and
wherein, when the detected posture of the controller exceeds a posture of the controller for causing the virtual camera to reach a lower limit of the parameter range, the processor is configured to change a current correspondence relation and to thereafter control the parameter of the virtual camera in the virtual space in accordance with the changed correspondence relation.

29. An information processing method for controlling a virtual camera in a virtual space in accordance with posture of a controller, the method comprising:
detecting aspects of the posture of the controller; and
controlling a parameter of the virtual camera in the virtual space, within a predetermined parameter range, based on a correspondence relation between the parameter of the virtual camera and posture of the controller,
wherein, when the detected posture of the controller exceeds a posture of the controller for causing the virtual camera to reach an upper limit of the parameter range, a current correspondence relation is changed and the parameter of the virtual camera is thereafter changed in the virtual space in accordance with the changed correspondence relation, and
wherein, when the detected posture of the controller exceeds a posture of the controller for causing the virtual camera to reach a lower limit of the parameter range, a current correspondence relation is changed and the parameter of the virtual camera in the virtual space is thereafter controlled in accordance with the changed correspondence relation.

30. An information processing system comprising:
a sensor configured to detect aspects of movement of a controller; and
a processing system in communication with the sensor and including at least one hardware processor, the processing system being configured to control a parameter of a virtual camera in a virtual space, within a predetermined parameter range, based on a correspondence relation between the parameter of the virtual camera and movement of the controller,
wherein, when the detected movement of the controller exceeds a movement of the controller for causing the virtual camera to reach an upper limit of the parameter range, the processing system is configured to change a current correspondence relation and to thereafter control the parameter of the virtual camera in the virtual space in accordance with the changed correspondence relation, and
wherein, when the detected movement of the controller exceeds a movement of the controller for causing the virtual camera to reach a lower limit of the parameter range, the processing system is configured to change a current correspondence relation and to thereafter control the parameter of the virtual camera in the virtual space in accordance with the changed correspondence relation.

31. The information processing system according to claim 30, wherein the parameter of the virtual camera comprises a capturing direction of the virtual camera in the virtual space.

32. The information processing system according to claim 30, wherein the parameter of the virtual camera comprises a position of the virtual camera in the virtual space.

* * * * *